United States Patent
Muendlein et al.

[11] Patent Number: 5,555,784
[45] Date of Patent: Sep. 17, 1996

[54] LATHE TOOL

[75] Inventors: Werner Muendlein, Bietigheim-Bissingen; Gerhard Scheer, Loechgau, both of Germany

[73] Assignee: Komet Praezisionswerkzeuge Robert Breuning GmbH, Besigheim, Germany

[21] Appl. No.: 244,695

[22] PCT Filed: Nov. 24, 1992

[86] PCT No.: PCT/EP92/02700

§ 371 Date: Aug. 22, 1994

§ 102(e) Date: Aug. 22, 1994

[87] PCT Pub. No.: WO93/10929

PCT Pub. Date: Jun. 10, 1993

[30] Foreign Application Priority Data

Dec. 6, 1991 [DE] Germany .................. 41 40 301.0

[51] Int. Cl.⁶ .................................................. B23B 29/08
[52] U.S. Cl. .................................... 82/158; 407/101
[58] Field of Search ................. 82/158, 160; 407/85–88, 407/92, 95, 98, 101

[56] References Cited

U.S. PATENT DOCUMENTS 4,606,680  8/1986  Striegl ........................ 408/59
4,655,655  4/1987  Schurfeld ..................... 82/160

FOREIGN PATENT DOCUMENTS

3026513  1/1982  Germany .
3725229  1/1988  Germany .

*Primary Examiner*—M. Rachuba
*Assistant Examiner*—Kenneth J. Hansen
*Attorney, Agent, or Firm*—Flynn, Thiel, Boutell & Tanis, P.C.

[57] ABSTRACT

A lathe tool having a cylindrical shaft and a head with a contact surface which rests against a support surface on the shaft. The tool head is detachably connected in force-locking fashion by means of a fitted screw to the tool shaft. The contact surface and the support surface are disposed at an acute angle to the axis of the shaft and have mutually engaging straight tooth systems which extends over the whole cross-section of the shaft. The parallel teeth of the tooth system are perpendicular to the direction of slope of the support and contact surfaces and parallel to a surface disposed with its axis parallel to that of the tool head and including an indexable cutting insert.

21 Claims, 7 Drawing Sheets

LATHE TOOL

FIELD OF THE INVENTION

The invention relates to a lathe tool with a preferably cylindrical shaft and a tool head carrying an exchangeable indexable cutting insert and resting with a contact surface on a support surface of the shaft, and with a holding screw connecting the tool head to the shaft, and with the contact surface and the support surface being arranged at an acute angle with respect to the axis of the shaft and having engaging straight tooth systems, with furthermore the holding screw being aligned essentially perpendicularly with respect to the support and contact surfaces, and with the indexable cutting insert being arranged countersunk in an essentially axially parallel flat surface preferably extending through the axis of the shaft and defining a chip chamber.

BACKGROUND OF THE INVENTION

It is known to provide lathe tools with a separating point in order to be able to attach different tool heads to a holder. It is furthermore known to connect the tool heads at the separating point of interface by means of screws, with several screws distributed around the periphery being provided for this purpose, which screws when being tightened produce the force locking. Additional forming elements, as for example pins, are commonly used for the form locking.

Furthermore, it is actually known in a tool for drilling and spotfacing to connect a tool head to a shaft through a straight tooth system (DE-30 26 513 C2). The parallel teeth of the straight tooth system extend there parallel to the direction of slope of the support and contact surfaces and transversely with respect to a plane containing the indexable cutting insert. The teeth are arranged such that through a longitudinal adjustment along the teeth a diameter change of the cutting edge is obtained. The screws extend for this purpose on the one side through slotted holes elongated parallel with respect to the teeth, which slotted holes define the range of adjustment. Furthermore, an eccentric screw is provided as the adjusting element.

SUMMARY OF THE INVENTION

The basic purpose of the invention is to provide a separating point for a lathe tool which makes it possible to combine different base members and tool heads with one another and which both in a static and also dynamic aspect guarantees a sufficiently rigid connection and yet enables a simple and quick exchange of the tool head.

To attain this purpose, the invention suggests that parallel teeth of the straight tooth system extend transversely with respect to the direction of slope of the support and contact surfaces and essentially parallel to the plane containing the indexable cutting insert, and that the holding screw has a fitted shaft, with which it extends into a fitted hole essentially perpendicularly extending through the tool head and the shaft in the area of the contact and support surfaces. The inventive design of the separating point has the advantage that the teeth of the straight tooth system extend parallel to the feeding direction of the cutting edge or the entire tool and thus transversely with respect to the main-cut direction of force.

According to a preferred embodiment of the invention, the axially parallel surface containing the indexable cutting insert transfers at its end closest to the shaft into a surface essentially parallel to the contact surface, with a perpendicular depression for the head of the holding screw being arranged in the area of said surface, which depression in turn transfers into the fitted hole for the holding screw.

The slope of the separating point or interface and the toothing angle are advantageously adjusted to one another and combined with one another such that one of the two tooth flanks of the straight tooth systems is aligned essentially parallel to the axially parallel surface containing the indexable cutting insert. In order to achieve this, the tooth flanks of the straight tooth system define an angle of 50° to 70°, preferably 60°, whereas the normal of the support surfaces defines an angle $\alpha$ of 15° to 45°, preferably 30°, with the axis of the shaft.

In order to obtain in the area of the straight tooth systems a surface pressure sufficient over the entire contact surface, it is suggested according to a preferred development of the invention that the contact surface and/or the support surface has a concave curvature extending about an axis parallel to the teeth of the straight tooth system. The radius of curvature R of the concave curvature is thereby chosen according to the equation $$R = aD^2 \cos^{-2} \alpha,$$

with D being the diameter of the shaft, $\alpha$ the angle of the slope of the normal of the support surfaces with respect to the axis of the shaft and a is a parameter in the order of magnitude of 3 to 12 mm$^{-1}$, preferably to 5 to 8 mm$^{-1}$. With this it is achieved that the contact and support surfaces, which rest against one another have in the untightened state in the center area of penetration of the clamping screw a spacing of 10 to 40 μm therebetween. A similar effect can be achieved by the tool head and/or the shaft having a free depression in the area of the contact and support surface through which the fitted hole extends. In order to achieve a high inherent stability and a sufficiently rigid connection, the depth of the fitted recess at the end of the shaft should, according to a further advantageous development of the invention, be 0.5 to 1.5 times its diameter.

According to a further preferred development of the invention, the fitted hole is constructed, at the end of the tool head, as a slotted hole elongated transversely with respect to the teeth of the straight tooth system and having a tolerance fit in the direction of the tooth. An additional degree of freedom results from the slotted hole, which degree of freedom enables the exact fitting of the tool head without causing, due to tolerances in dimensions, an undesired reciprocal clamping between the tool head and shaft.

A further advantageous development of the invention provides that a cooling medium channel extends through the contact and support surfaces in the area of the straight tooth system outside of the fitted holes, which channel terminates in the chip chamber in the area of the surface containing the indexable cutting insert or the depression for the holding screw, and is there directed in the direction of an active cutting edge of the indexable cutting insert, and is loaded with cooling medium from the end of the shaft. With this it is achieved that the coiled chips created during the machining operation are loaded with cooling medium at the point of creation and are thereby, due to cooling, maintained in their form and are flushed out of the hole. The eccentric arrangement of the cooling medium hole in the through area outside of the fitted hole assures that the cooling medium channel is sufficiently sealed off toward the outside.

An advantageous further development of the invention provides that an intermediate piece is arranged between the shaft and the tool head, which piece has on its faces which are sloped with respect to the axis of the shaft, straight tooth systems complementary to the straight tooth systems of the shaft at the one end and the tool head at the other end, through which straight tooth systems extend in pairs a fitted hole for the reception of a fitted shaft of a holding screw. When the faces of the intermediate piece are aligned parallel to one another, the intermediate piece has the function of an extension of the fitted shaft. When, on the other hand, the faces of the intermediate piece are arranged rotated at 180° with respect to one another about the axis of the shaft, then the intermediate piece has the function of a turnover head adapter. Thus, it is possible to manufacture a turnover head tool with the same base holder and tool head. When in addition the diameter of the face of the intermediate piece at the end of the shaft is larger than the diameter of the face at the end of the tool head, then the intermediate piece represents a reducing adapter or a turnover head reducing adapter, which makes it possible to connect a tool head with a smaller diameter to a given base holder.

In order to be able to precisely fit the intermediate piece in spite of the existing tolerances, the fitted hole of the intermediate piece on the end of the shaft is designed as a slotted hole elongated transversely to the teeth of the straight tooth system and having a tolerance fit in direction of the teeth. Furthermore, at least one of the surfaces, which face one another and contain the straight teeth, can have a concave curvature extending about an axis parallel to the teeth of the straight tooth system, which curvature assures that the surface pressure in the area of the outside diameter is greater than in the center area, with the result of a higher resistance to bending.

BRIEF DESCRIPTION OF THE DRAWING

The invention will be discussed in greater detail hereinafter in connection with one exemplary embodiment schematically illustrated in the drawings, in which.

DETAILED DESCRIPTION

The tools illustrated in the drawings are stationary tools intended for insertion into lathes. They consist essentially of a cylindrical shaft 10 with a base holder 12', 12", 12''' for connection to a turret lathe and a tool head 18 releasably fastened on the shaft 10 at a separating point or interface 14 by means of a fitted screw 16.

Figure 1:
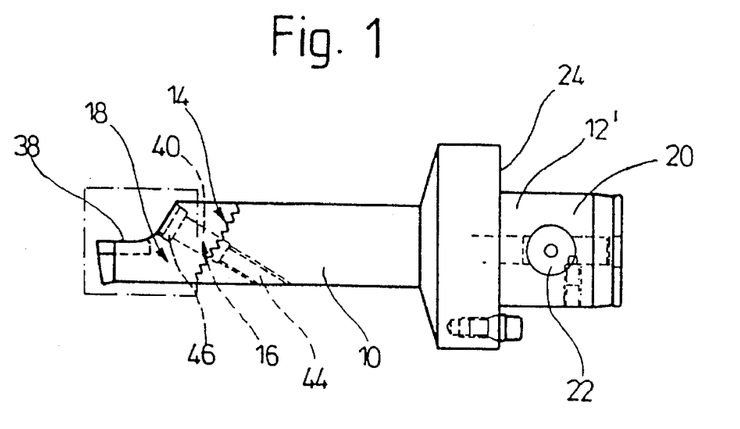
FIG. 1 is a side view of a two-part lathe tool with an ABS base holder (ABS is a Trademark of the Komet Stahlhalter- und Werkzeugfabrik Robert Breuning GmbH company)
Figure 2:
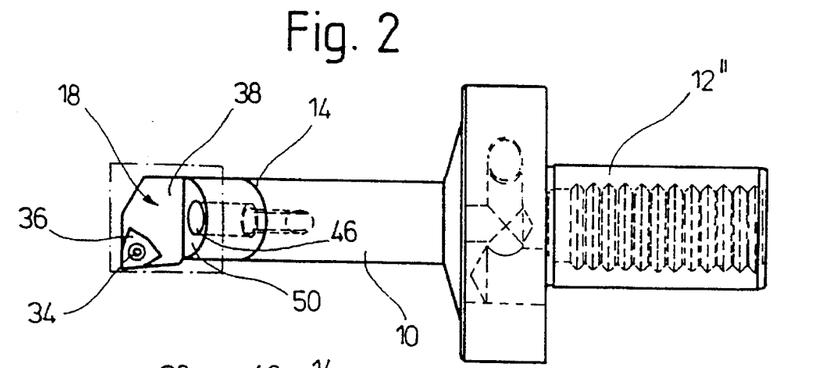
FIG. 2 is a view of a two-part lathe tool with an NC base holder, which view is rotated at 90° compared to FIG. 1.
Figure 3:
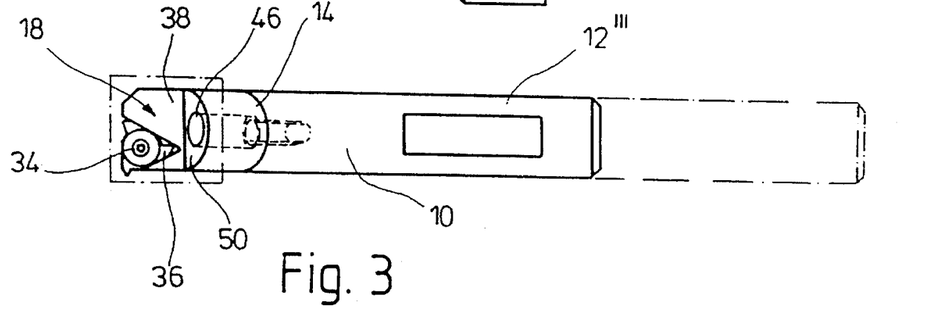
FIG. 3 is a side view corresponding to FIG. 2 with a circular shaft base holder.
Figure 4A:
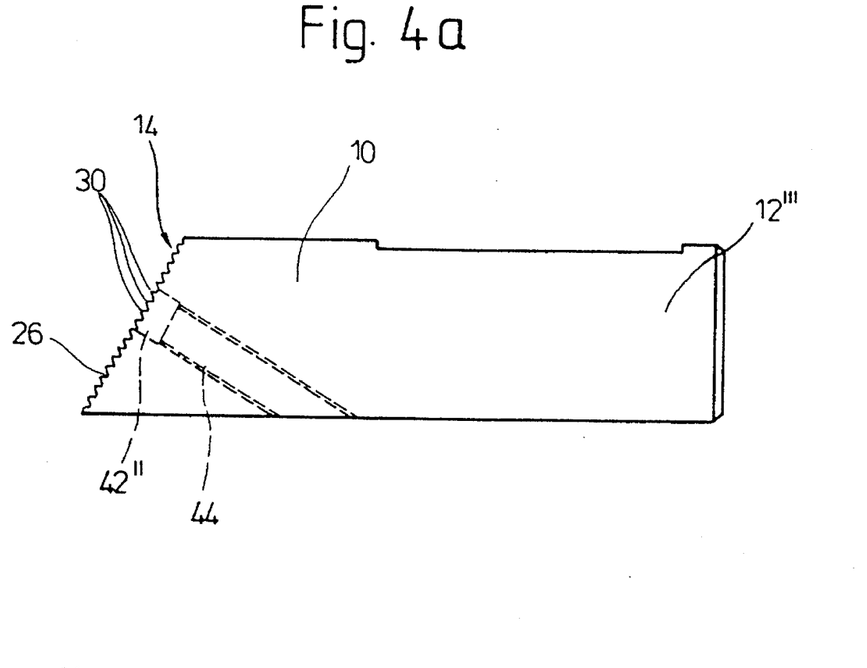
FIGS. 4a and 4b are two side views of a circular shaft, which views are rotated at 90° with respect to one another.
Figure 4B:
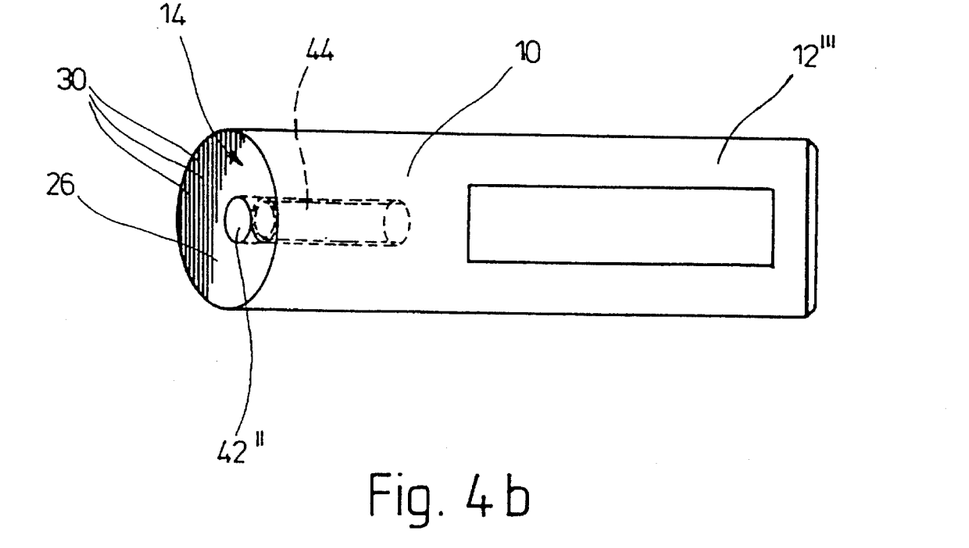

The base holder 12' in the exemplary embodiment illustrated in FIG. 1 is designed as an ABS coupling part having a fitting pin 20, a floating bolt 22 and a flat annular surface 24, whereas a NC receiving means 12" or rather a circular shaft 12''' is provided as the base holder in FIGS. 2 and 3.

Figures 5A, 5B, 5C:
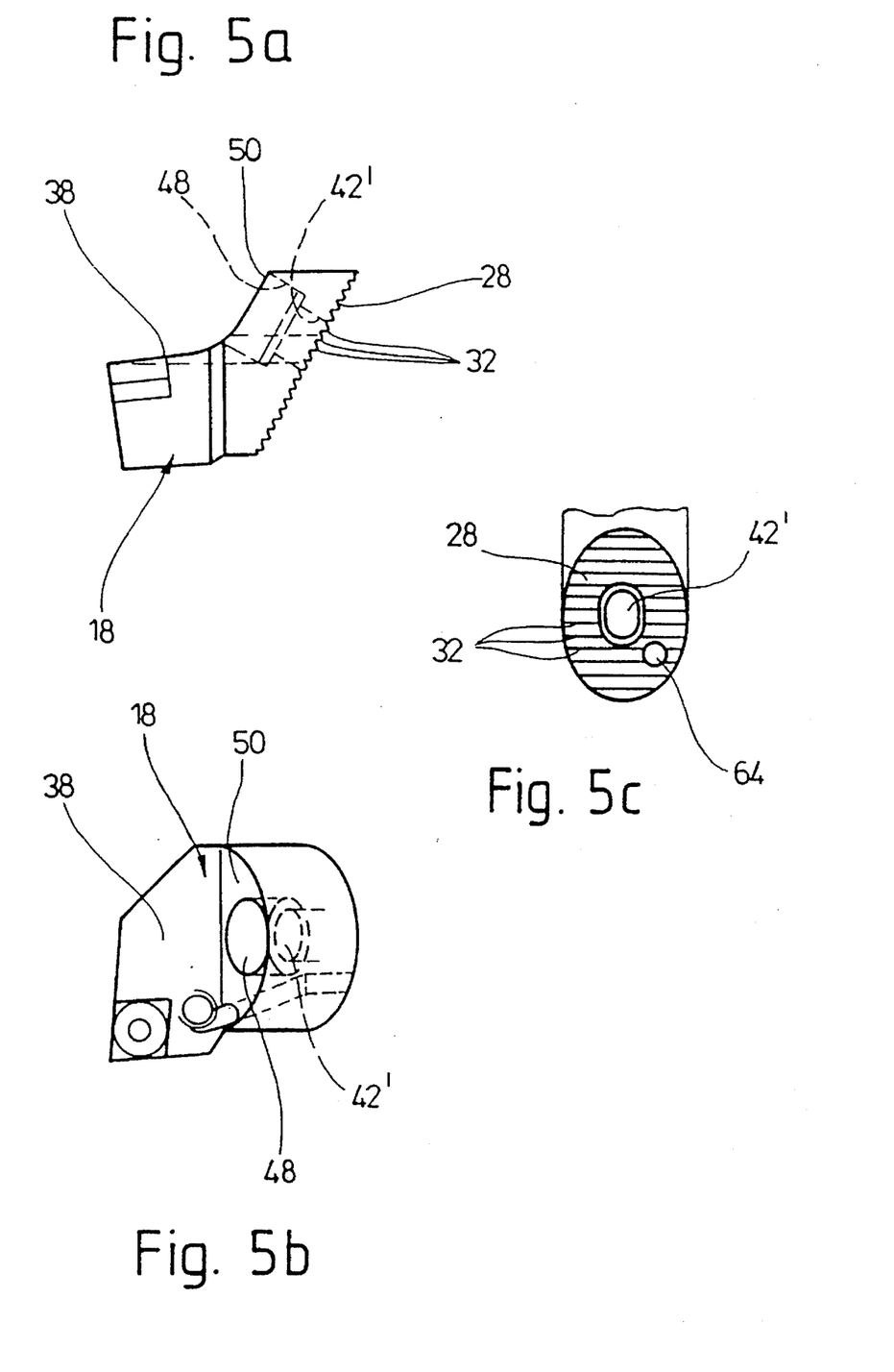
FIGS. 5a to 5c are side views of a tool head, which views are rotated at 90° with respect to one another, and a plan view of the contact surface on the tool head.

The separating point or interface 14 has a support surface 26 on an end of the shaft and a contact surface 28 on an end of the tool head, which contact surface defines an acute angle of approximately 30° with the shaft axis. The support surface 26 and the contact surface 28 have furthermore engaging straight tooth systems 30, 32 which extend over the entire cross section of the shaft, the teeth of which are parallel to one another and extend transversely with respect to the direction of slope of the support and contact surfaces 26, 28. The tool head 18 carries an exchangeable indexable cutting insert 36 held by a clamping screw 34, which indexable cutting insert 36 is arranged countersunk in an axially parallel extending flat surface 38 of the tool head 18, which flat surface extends through the shaft axis and defines a chip chamber. The indexable cutting insert 36 can also be fastened to the tool head by different clamping means, for example by clamping fingers or a clamping lever. The teeth of the straight tooth systems 30, 32 are aligned parallel to the surface 38 containing the indexable cutting insert, with the slope of the separating point or interface and of the toothing angle being adjusted to one another and combined with one another in such a manner that one of the tooth flanks extends in the feeding direction of the tool parallel to the tool axis and thus parallel to the indexable cutting insert surface 38. The fitted screw 16 extends with its fitted shaft 40 into a fitted bore 42', 42" in the tool head and in the shaft 10, which fitted hole extends perpendicularly through the interface, and is screwed from the end of the tool head 18 into a tapped hole 44 in the shaft 10, which tapped hole follows the fitted bore 42". The fitted screw 16 is supported at the other end thereof with its head 46 in a depression 48 of the tool head 18, which depression is arranged in the area of a sloped surface 50 of the tool head 18, which sloped surface is parallel to the contact surface 28 and follows the indexable cutting insert surface 38 of the tool head. The fitted recess 42" on the end of the shaft has a depth, which is 0.5 to 1 times the screw diameter. As can be seen in FIG. 5c, the fitted recess 42' on the end of the tool head 18 is designed as a slotted hole elongated transversely to the teeth of the straight tooth system 32 and having a tolerance on fit in the longitudinal direction of the teeth. With this it is achieved that the f-dimension, namely the projecting length of the cutting tip from the central axis is defined by the tolerance on fit of the fitted screw and the tip projection, thus the dimension of the cutting tip with respect to a defined transverse axis is defined by the teeth of the straight tooth systems, and thus an exact fit of the tool head, in spite of existing tolerances, is guaranteed.

In order to obtain a sufficiently rigid surface connection over the entire separating point or interface, the support surface 26 and/or the contact surface 28 have a concave curvature extending transversely with respect to the toothing, like on an annular gear, which assures that the mentioned surfaces in the untightened state have in the area of the fitted screw a spacing of 10 to 30 μm, which is reduced by an elastic deformation during tightening of the fitted screw 16. With this it is achieved that the surface pressure in the area of the outside diameter is greater than in the center area, which has a favorable effect on the bending strength. In place of the curvature, it is also possible to provide a free depression in the center area around the screw. The straight tooth systems 30, 32 are advantageously fully ground by means of a profile grinding disk. The curvature radius with the annular gear effect is introduced through the suitably shaped grinding disk.

Figure 6:
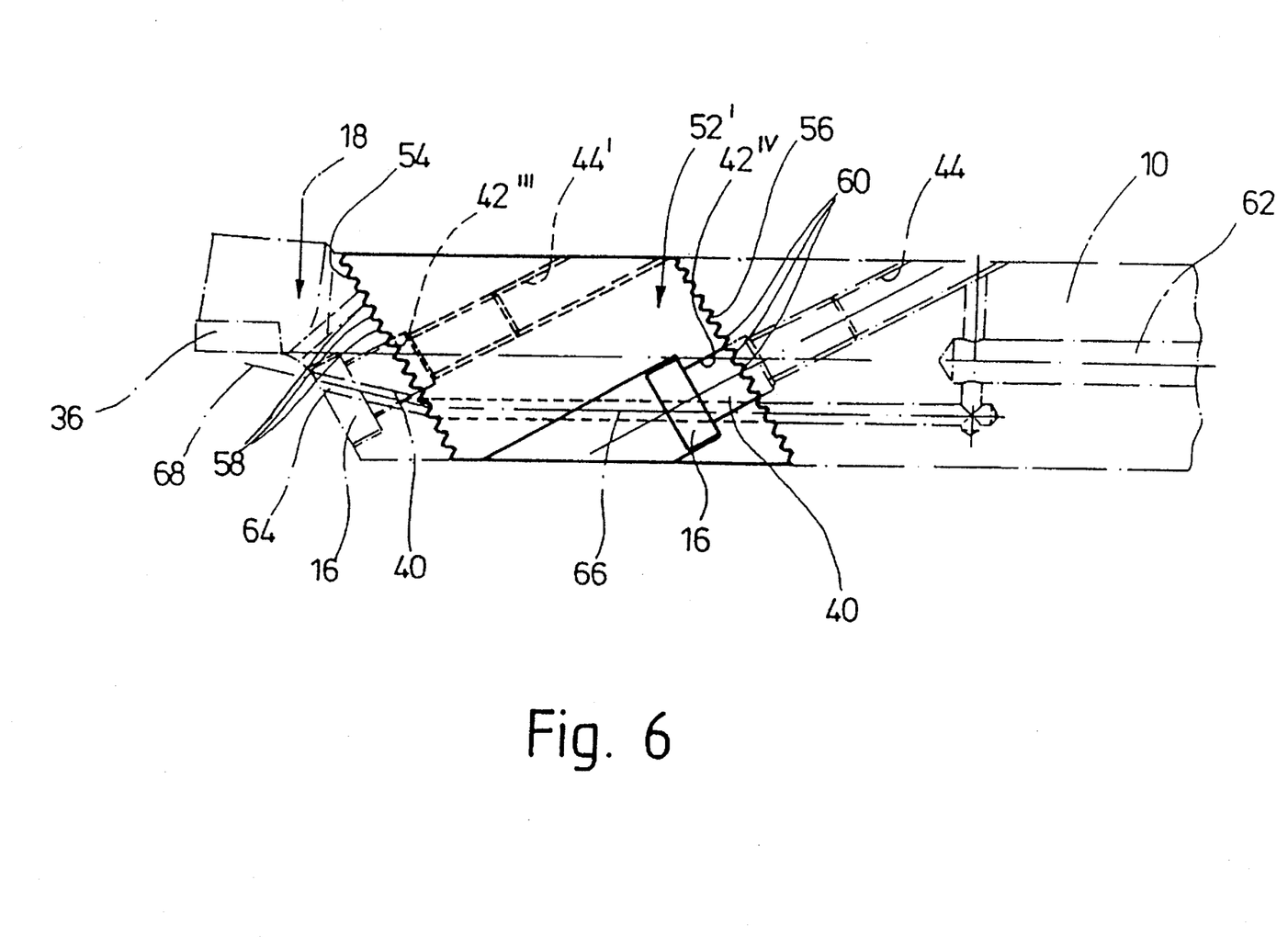
FIG. 6 is a side view of an intermediate piece designed as an extension piece.
Figure 7:
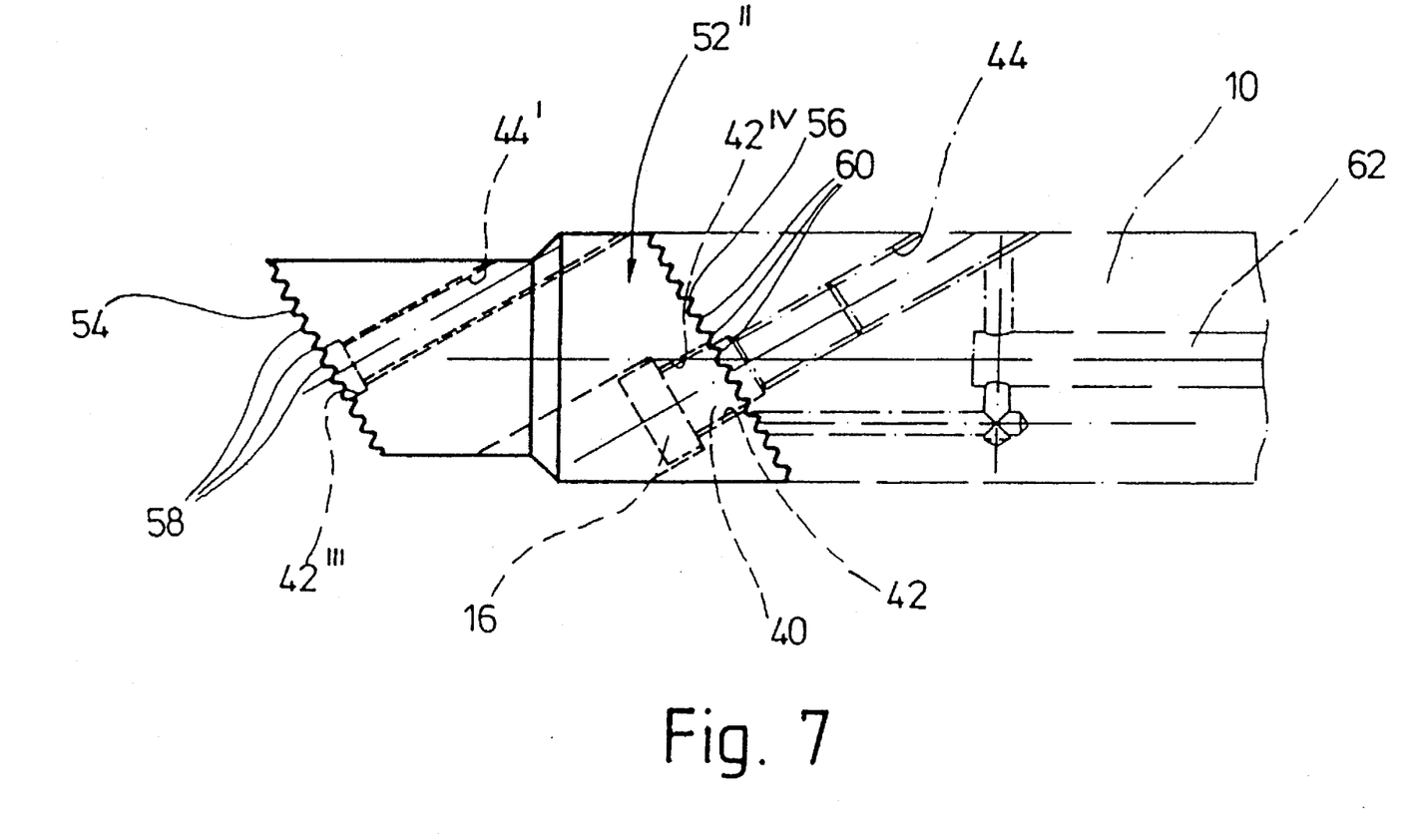
FIG. 7 is a side view of an intermediate piece designed as a reduction piece.
Figure 8:
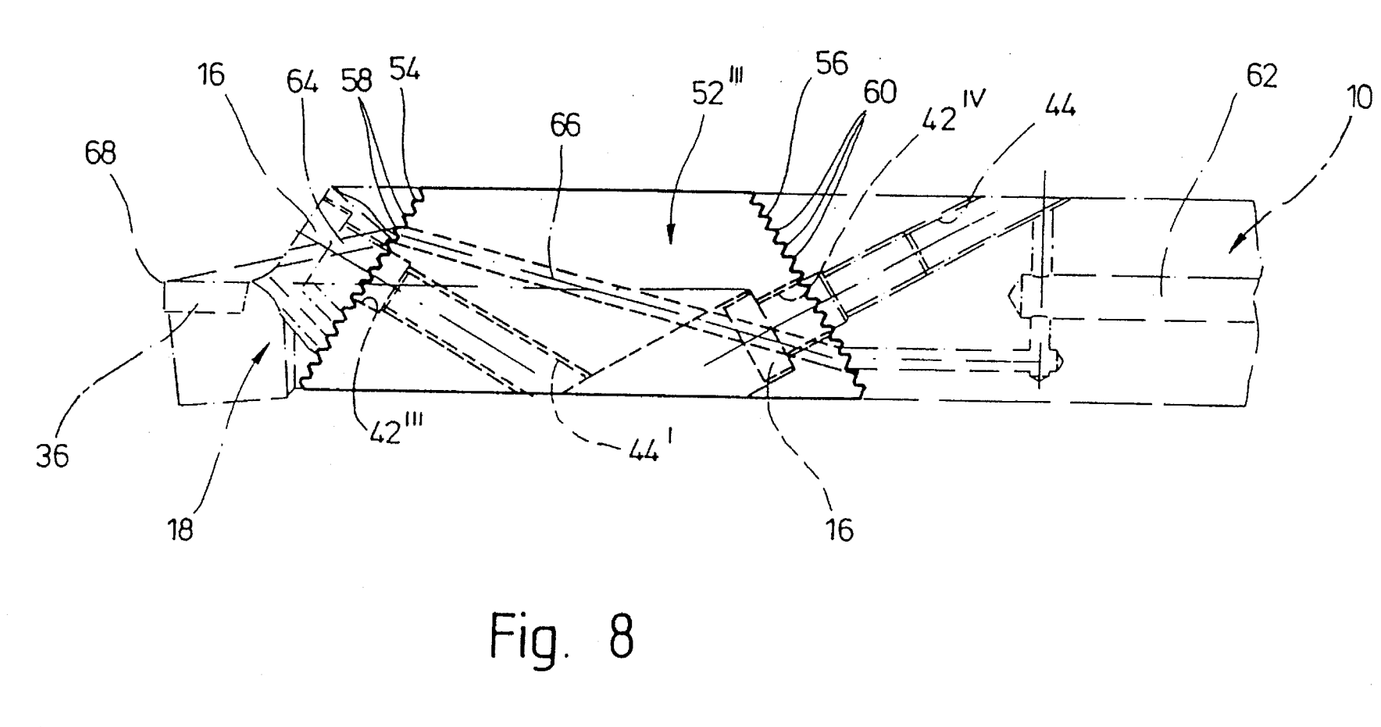
FIG. 8 is a side view of an intermediate piece designed as a turnover head adapter.

As can be seen in FIGS. 6, 7 and 8, an intermediate piece 52', 52", 52''' can be arranged between the shaft 10 and the tool head 18, which intermediate piece has straight tooth systems 58, 60 on its faces inclined with respect to the axis of the shaft, which straight tooth systems are complimentary on the one hand to the straight tooth systems 32, 30 of the tool head 18 and on the other hand to the shaft. Through the straight tooth systems 32, 58 or 60, 30 which face one another extend, in pairs, a fitted hole 42', 42''' or rather 42$^{IV}$, 42'' for engagement by holding screws 16 having a fitted shaft 40. The fitted screws are screwed with their external thread into a tapped hole 44' in the intermediate piece or in the tapped hole 44 of the shaft. The intermediate piece 52' according to FIG. 6 is an extension piece of a constant diameter, the intermediate piece 52'' according to FIG. 7 a reducing piece and the intermediate piece 52''' according to FIG. 8 a turnover head adaptor.

The shaft 10, the tool head 18 and, if necessary, the existing intermediate piece 52', 52'', 52''' are necessarily provided with a cooling medium channel 62, 64, 66, which extends off-center through the separating points in the area of the straight tooth systems and terminates in the chip chamber formed by the surfaces 38 or 50 in such a manner that the cooling medium supplied under pressure at the end of the shaft flows against the active cutting edge 68 of the indexable cutting insert 36 (compare FIGS. 5b and 6).

Figure 9:
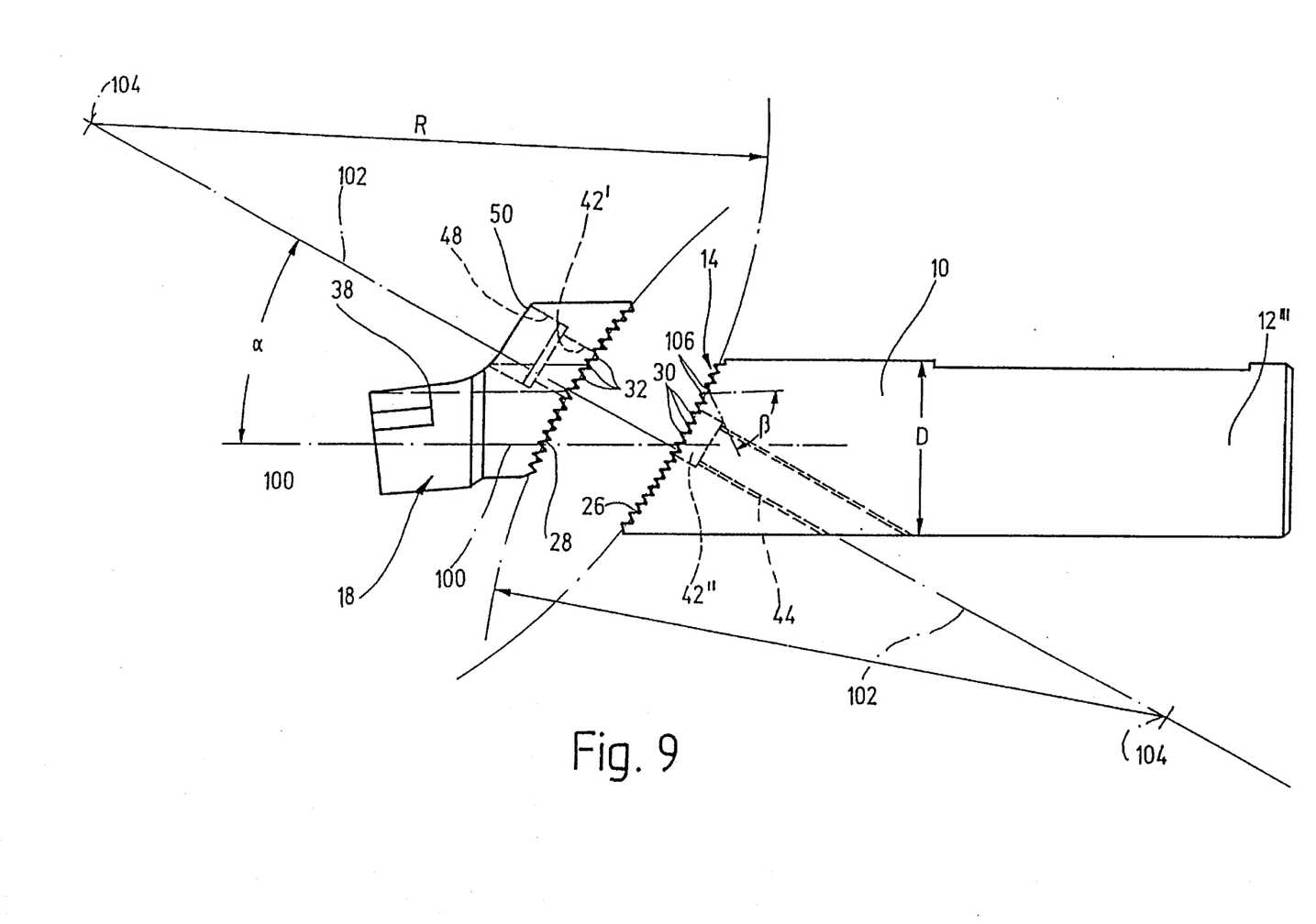
FIG. 9 is a side of the shaft and tool head separated from one another.

Referring to FIG. 9, the slope of the separating point or interface and the toothing angle β are advantageously adjusted to one another and combined with one another such that one of the two tooth flanks 106 of the straight tooth systems 30,32 is aligned essentially parallel to the axially parallel surface 38 containing the indexable cutting insert 36. In order to achieve this, the tooth flanks 106 of the straight tooth system define an angle β of 50° to 70°, preferably 60°, whereas the normal of the support surfaces defines an angle α of 15° to 45°, preferably 30°, with the axis of the shaft.

In order to obtain in the area of the straight tooth systems 30,32 a surface pressure sufficient over the entire contact surface, it is suggested according to a preferred development of the invention that the contact surface 28 and/or the support surface 26 has a concave curvature extending about an axis 104 parallel to the teeth of the straight tooth system 30,32. The radius of curvature R of the concave curvature is thereby chosen according to the equation $$R=aD^2 \cos^{-2} \alpha,$$

with D being the diameter of the shaft, α the angle of the slope of the normal 102 of the support surfaces 26,28 with respect to the axis 100 of the shaft 10 and a is a parameter in the order of magnitude of 3 to 12 mm$^{-1}$, preferably to 5 to 8 mm$^{-1}$ ($mm^{-1}=1/mm$). With this it is achieved that the contact and support surfaces 26,28, which rest against one another have in the untightened state in the center area of penetration of the clamping screw a spacing of 10 to 40μm therebetween. A similar effect can be achieved by the tool head and/or the shaft having a free depression in the area of the contact and support surface through which the fitted hole extends. In order to achieve a high inherent stability and a sufficiently rigid connection, the depth of the fitted recess at the end of the shaft should, according to a further advantageous development of the invention, be 0.5 to 1.5 times its diameter.

In summary the following is stated: The invention relates to a lathe tool having a cylindrical shaft 10 and a tool head 18 resting with a contact surface 28 on a support surface 26 of the shaft 10. The tool head 18 is releasably connected force-lockingly to the shaft 10 by means of a fitted screw 16. The contact surface 28 and the support surface 26 are arranged, at an acute angle with respect to the axis of the shaft and have engaging straight tooth systems 30, 32 which extend over the entire cross section of the shaft. The parallel teeth of the straight tooth systems 30, 32 are aligned transversely with respect to the direction of slope of the support and contact surfaces 26, 28 and parallel to an axially parallel surface 38 of the tool head which surface contains an indexable cutting insert 36.

The embodiments of the invention in which an exclusive property or privilege is claimed are defined as follows:

1. In a lathe tool comprising a cylindrical shaft having thereon a support surface and a tool head carrying an exchangeable indexable cutting insert, said tool head having thereon a contact surface connected in face-to-face relation with said support surface, and a holding screw for connecting said tool head to said cylindrical shaft, said contact surface and said support surface being arranged at an acute angle slope with respect to a longitudinal axis of said cylindrical shaft and each having engaging straight tooth systems thereon, said holding screw having an axis which extends generally perpendicularly with respect to said support surface and said contact surface, said indexable cutting insert being arranged countersunk in a recess provided in a generally axially parallel flat surface extending generally through said axis of said cylindrical shaft and defining a chip chamber, said teeth of said straight tooth systems each extending generally parallel to each other and to said flat surface containing said indexable cutting insert, the improvement wherein a plane extending parallel to an interface between said contact surface and said support surface is sloped in a direction away from a plane containing said flat surface so as to define an obtuse angle therebetween, wherein said tool head and said cylindrical shaft have a fitted hole extending therein, an axis of each of which is perpendicular to a respective said contact surface and said support surface, wherein said parallel teeth of said straight tooth systems extend transversely with respect to the direction of said slope of said support surface and said contact surface, and wherein said holding screw has a fitted shaft thereon received in both of said fitted holes and extends in a direction through said tool head and said cylindrical shaft generally perpendicular to an inside an area defined by said interface between said contact surface and said support surface.

2. The lathe tool according to claim 1, wherein said flat surface containing said indexable cutting insert transfers at its end closest to said cylindrical shaft into a further surface which is generally parallel with respect to said contact surface, said further surface having a perpendicularly extending depression therein for a head of said holding screw transferring into said fitted hole for said holding screw.

3. The lathe tool according to claim 2, further including a cooling medium channel extending through said contact surface and said support surface in said area having said straight tooth system thereon outside of said fitted holes, terminating in said chip chamber in at least one of an area of said flat surface containing said indexable cutting insert and said depression, and there directed in direction of an active cutting edge of said indexable cutting insert, and loadable with cooling medium from an end of said cylindrical shaft.

4. The lathe tool according to claim 1, wherein said contact surface and said support surface each have a concave radius of curvature extending around an axis which is parallel with respect to the teeth of said straight tooth system.

5. The lathe tool according to claim 3, wherein said radius of curvature is chosen according to the equation $$R=aD^2 \cos^{-2} \alpha,$$

where D is the diameter in millimeters of said cylindrical shaft, $\alpha$ is the angle of slope of said perpendicular to said support surface with respect to the axis of said cylindrical shaft and a is a parameter in the order of magnitude of 3 to 12 $mm^{-1}$ 12mm.

6. The lathe tool according to claim 5, wherein said order of magnitude is 5 to 8 mm.

7. The lathe tool according to claim 1, wherein a depth of said fitted hole at an end of said cylindrical shaft corresponds with 0.5 to 1.5 times a diameter thereof.

8. The lathe tool according to claim 1, wherein said tool head and said cylindrical shaft has a free depression in the area of said contact and said support surface through which said fitted holes extends.

9. The lathe tool according to claim 1, wherein said perpendicular to said support surface defines an angle in the range of 15° to 45° with said axis of said cylindrical shaft.

10. The lathe tool according to claim 9, wherein said angle is 30°.

11. The lathe tool according to claim 1, wherein said tooth flanks of said straight tooth systems define an angle in the range of 50° to 70° with one another.

12. The lathe tool according to claim 8, wherein said angle is 60°.

13. The lathe tool according to claim 1, wherein one of the tooth flanks of said straight tooth systems is aligned essentially parallel with respect to the axially parallel surface containing said recess for said indexable cutting insert.

14. The lathe tool according to claim 1, wherein said fitted hole on a side of said tool head is designed as a slotted hole elongated transversely to said teeth of said straight tooth system and having a close tolerance fit in the direction of a respective tooth thereof.

15. The lathe tool according to claim 1, further including an intermediate piece arranged between said cylindrical shaft and said tool head, said intermediate piece having on faces thereof which are sloped with respect to said axis of said cylindrical shaft, further straight tooth systems complementary to said straight tooth systems on said shaft, on the one hand, and said tool head, on the other hand, through which straight tooth systems, extending in pairs, are said fitted holes for receiving said fitted shaft of said holding screw.

16. The lathe tool according to claim 15, wherein said faces of said intermediate piece are aligned parallel to one another.

17. The lathe tool according to claim 15, wherein said faces of said intermediate piece are arranged thereon rotated at 180° with respect to one another about said axis of said cylindrical shaft.

18. The lathe tool according to claim 15, wherein said face of said intermediate piece facing said cylindrical shaft is larger than the face on a side thereof facing said tool head.

19. The lathe tool according to claim 15, wherein said fitted hole of said intermediate piece on a side thereof facing said cylindrical shaft, is designed as a slotted hole elongated transversely to said teeth of said further straight tooth system and having a tolerance fit in a longitudinal direction of said teeth.

20. The lathe tool according to claim 15, wherein at least one of the surfaces facing one another and containing a respective one of said straight tooth systems has a concave radius of curvature extending about an axis which is parallel to said teeth of said straight tooth system.

21. The lathe tool according to claim 20, wherein said radius of curvature is chosen according to the equation $$R=aD^2 \cos^{-2} \alpha,$$

where D is the diameter in millimeters of said cylindrical shaft, $\alpha$ is the angle of slope of said perpendicular to said support surface with respect to the axis of said cylindrical shaft and a is a parameter in the order of magnitude of 3 to 12 $mm^{-1}$.

* * * * *

UNITED STATES PATENT AND TRADEMARK OFFICE
CERTIFICATE OF CORRECTION

PATENT NO. : 5 555 784
DATED : September 17, 1996
INVENTOR(S) : Werner MUENDLEIN et al.

It is certified that error appears in the above-indentified patent and that said Letters Patent is hereby corrected as shown below:

Column 7, line 15; delete "12mm" (second occurrence).

line 17; change "8 mm" to ---8 mm$^{-1}$---.

line 33; change "claim 8," to ---claim 11,---.

Signed and Sealed this

Twenty-fifth Day of February, 1997

Attest:

BRUCE LEHMAN

*Attesting Officer*  *Commissioner of Patents and Trademarks*